United States Patent [19]

Inoue

[11] Patent Number: 5,489,897
[45] Date of Patent: Feb. 6, 1996

[54] POWER CONTROL MONITORING SYSTEM FOR UNDERWATER CABLE COMMUNICATIONS SYSTEMS

[75] Inventor: Yoshiyuki Inoue, Kawasaki, Japan

[73] Assignee: Fujitsu Limited, Kawasaki, Japan

[21] Appl. No.: 46,995

[22] Filed: Apr. 13, 1993

[30] Foreign Application Priority Data

Apr. 15, 1992 [JP] Japan ................................. 4-121200

[51] Int. Cl.$^6$ .................................................... G05B 23/00
[52] U.S. Cl. ............................. 340/870.39; 340/310.06; 340/825.06; 364/551.01
[58] Field of Search ................. 379/348, 4; 340/395.05, 340/825.06, 825.16, 825.17, 825.18, 870.39, 855.8, 425, 310 A, 310 R, 300.01, 310.06; 375/3, 3.1; 364/551.01

[56] References Cited

U.S. PATENT DOCUMENTS

| | | | |
|---|---|---|---|
| 4,322,849 | 3/1982 | Calabrese | 375/3 |
| 4,471,348 | 11/1984 | London et al. | 340/521 |
| 4,538,262 | 8/1985 | Sinniger et al. | 370/85 |
| 4,542,496 | 9/1985 | Takeyama et al. | 340/825.05 |
| 4,630,268 | 12/1986 | Rodenbaugh | 379/4 |
| 4,716,575 | 12/1987 | Douros et al. | 375/3 |
| 4,752,698 | 6/1988 | Furuyama et al. | 340/825.16 |
| 5,012,120 | 4/1991 | Minagawa et al. | 340/825.05 |
| 5,087,911 | 2/1992 | Green et al. | 340/825.05 |

FOREIGN PATENT DOCUMENTS

| | | |
|---|---|---|
| 63-305634 | 12/1988 | Japan . |
| 64-47239 | 2/1989 | Japan . |
| 1-117433 | 5/1989 | Japan . |
| 2-193444 | 7/1990 | Japan . |

Primary Examiner—Brent A. Swarthout
Assistant Examiner—Daniel J. Wu
Attorney, Agent, or Firm—Greer, Burns & Crain, Ltd.

[57] ABSTRACT

In a power control monitoring system for monitoring a power feed for a cable communications system including n cable landing stations where n is an integer, a network connects m cable landing stations among the n cable landing stations to each other by communications lines other than power feed cables connecting the n cable landing stations where m is an integer equal to or smaller than n. A sender/receiver, which is provided in each of the m cable landing stations, transfers information concerning the power feed with respect to the m cable landing stations to each other. A control and output unit, which is provided in each of the m cable landing stations, gathers the information concerning the power feed with respect to the m cable landing stations and outputs the information so that the information is simultaneously output in the m cable landing stations.

12 Claims, 11 Drawing Sheets

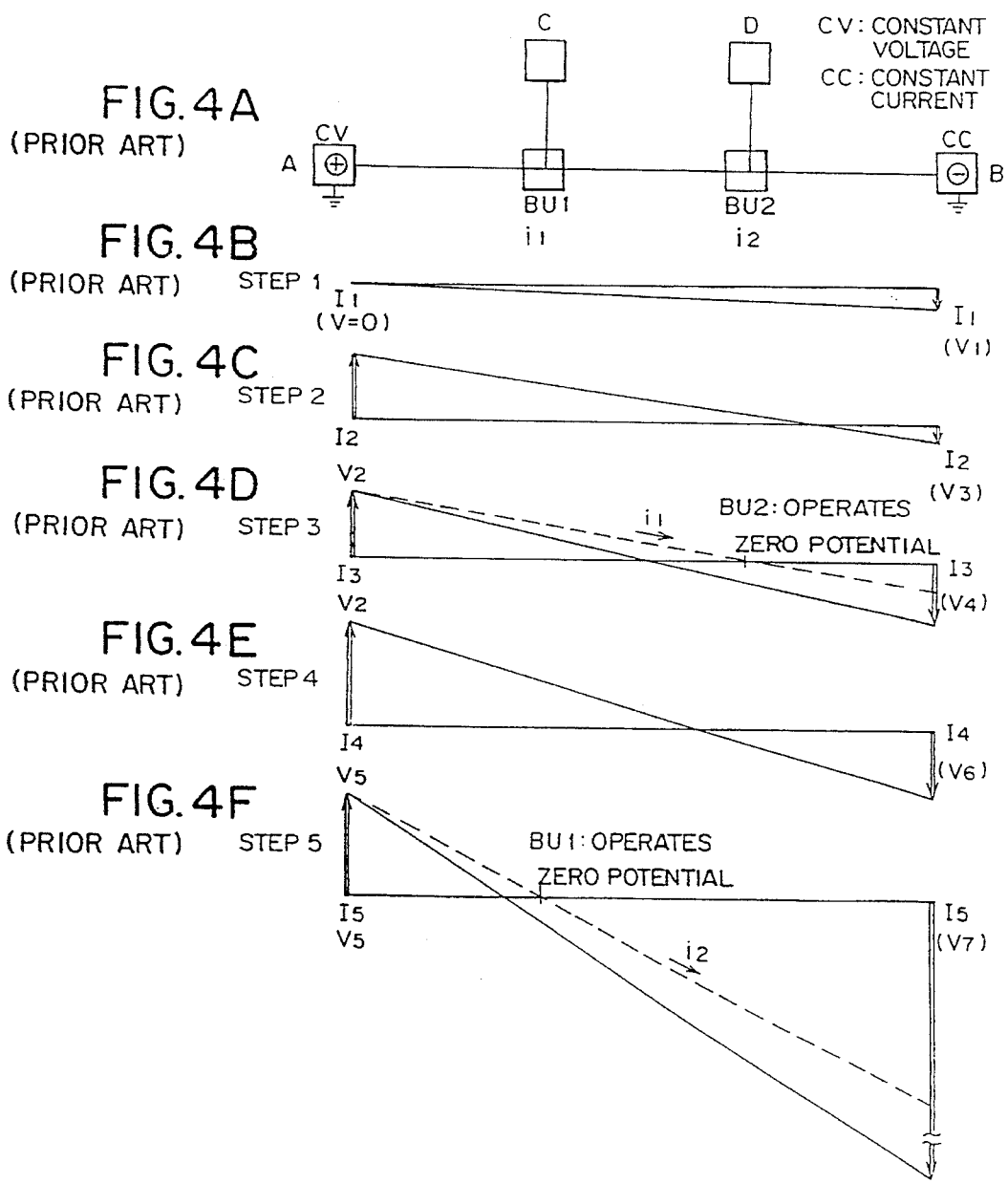

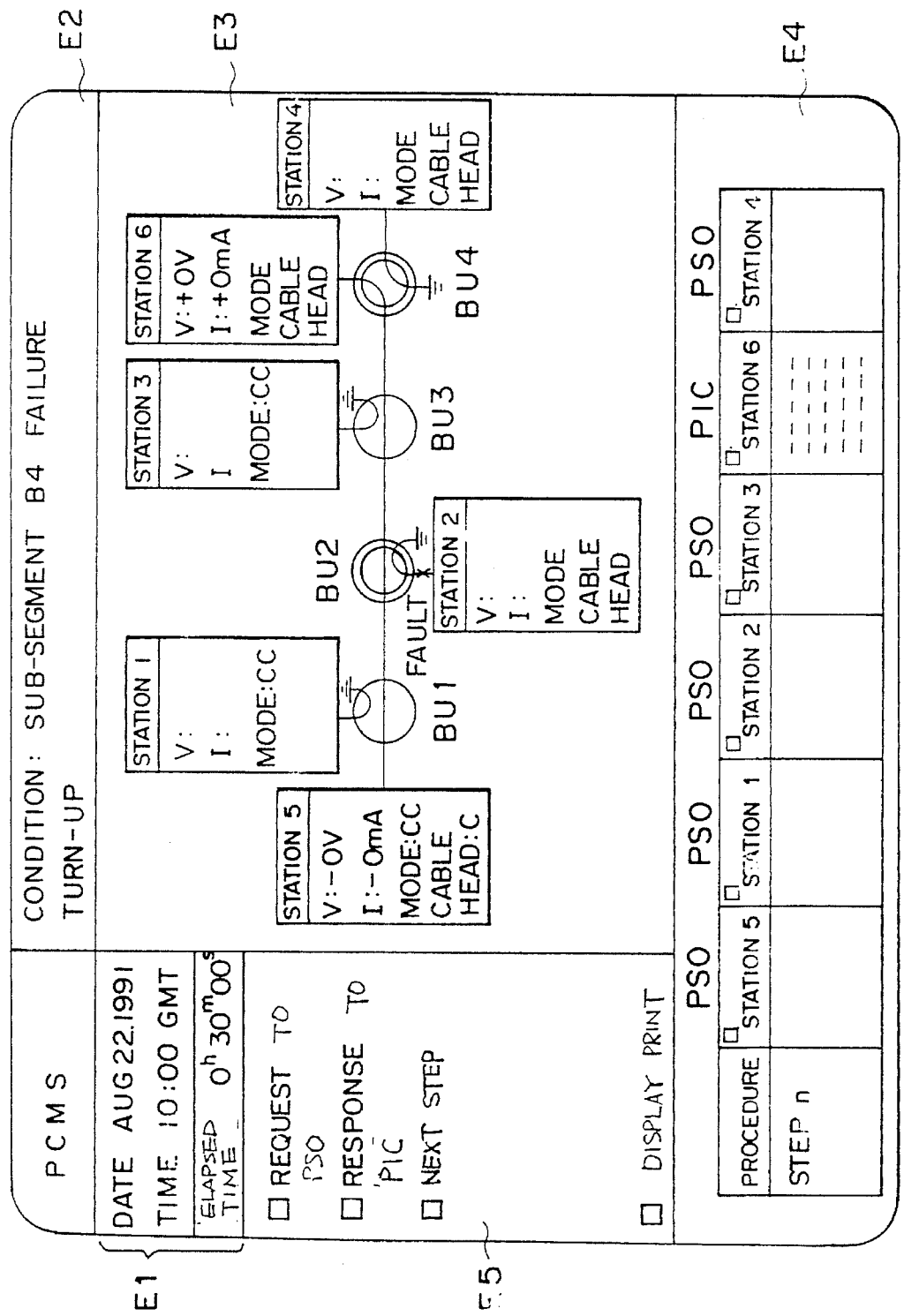

FIG. 9A

REQUEST TO PSO                CLOSE

☐ REQUEST
☐ REPORT
☐ HURRY UP
☐ STOP
☐ RETRY
☐ COMMENT

FIG. 9B

RESPONSE TO PIC                CLOSE

☐ ACKNOWLEDGED
☐ EXECUTED
☐ WAIT
☐ COMMENT

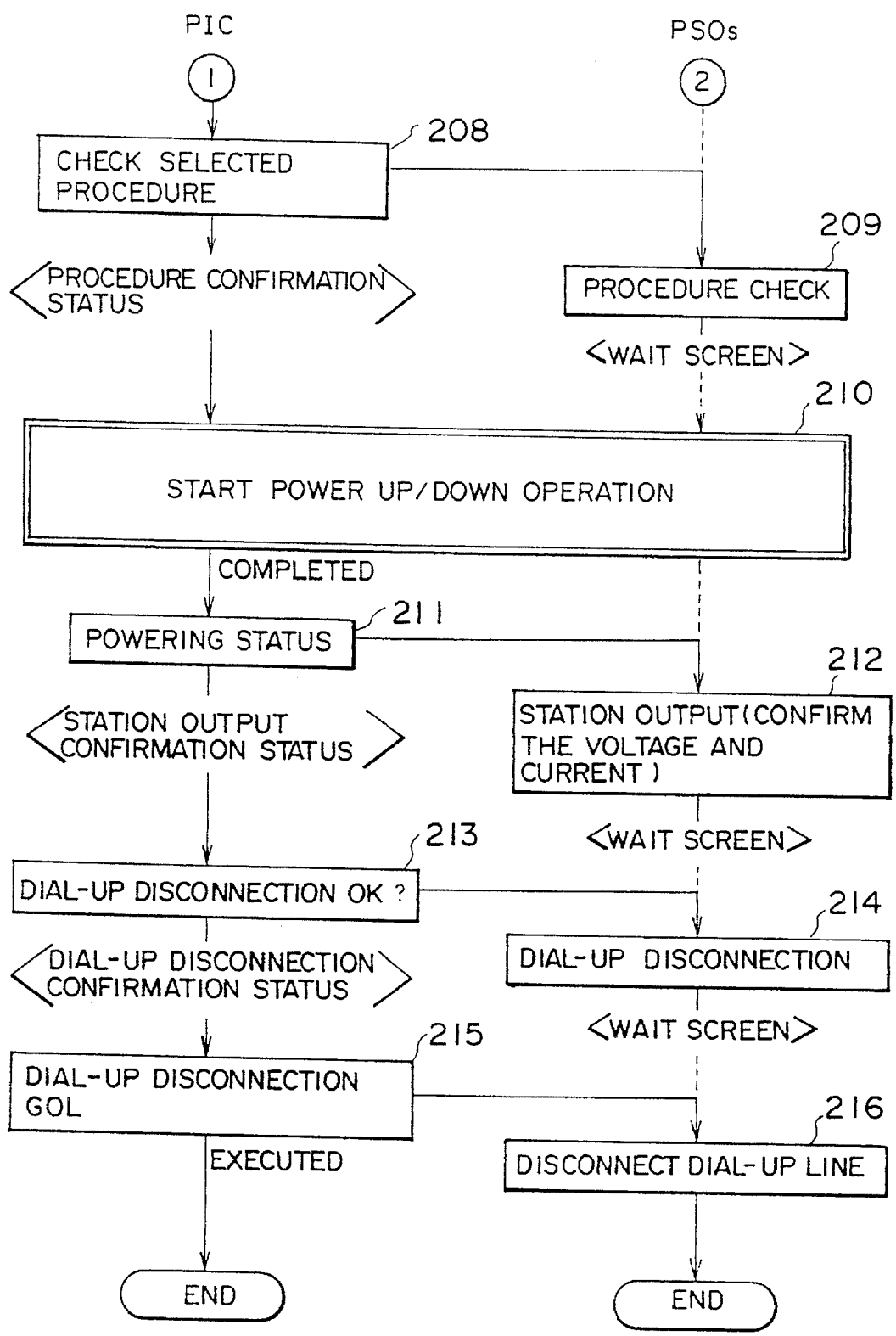

POWER CONTROL MONITORING SYSTEM FOR UNDERWATER CABLE COMMUNICATIONS SYSTEMS

BACKGROUND OF THE INVENTION

1. Field of the Invention

The present invention generally relates to a power control monitoring system for an underwater cable communications system, and more particularly to a power control monitoring system for monitoring a power feed system in an underwater cable communications system in which more than two cable landing stations are connected to each other via an underwater cable branching unit.

2. Description of the Prior Art

An underwater cable communications system, such as an optical underwater cable communications system, has underwater repeaters located at predetermined intervals. It is necessary to feed power to the underwater repeaters. Cable landing stations have power feed equipment (PFE) which feed power to the underwater repeaters through power feed cables. The power of feed cables are provided separately from optical cables for communications.

FIGS. 1A and 1B are diagrams illustrating a procedure for feeding power to repeaters REP provided in a cable connecting two cable landing stations A and B. As shown in FIG. 1A, the cable landing stations A and B communicate with each other via a public or private communications channel provided by a satellite or an existing underwater cable. Power feed equipment provided in the station A sets an output current to a predetermined level, and thereafter a power feed equipment provided in the station A sets an output current to a predetermined level. Hence, as shown in FIG. 1B, a current flows in the cable from the station A to the station B, and the repeaters REP provided in the cable are supplied with power. The power feed shown in FIG. 1B is called a two-end power feed.

FIGS. 2A, 2B and 2C are diagrams illustrating a power feeding procedure for an underwater cable communications system including three stations A, B and C. Normally, as shown in FIG. 2A, a cable branching unit BU provided in the sea connects the three stations A, B and C to each other by means of power feed cables. When a fault has occurred in the system, power feed paths are switched in the cable branching unit BU in order to cope with the fault. The branching unit BU has a high breakdown voltage relay for switching the power feed paths. The relay in the cable branching unit BU can be driven by the cable landing stations by controlling a current or voltage output by the power feed equipment provided in the cable landing stations.

If the potential of the cable branching unit BU is high with respect to the ground potential at the time of switching the relay, a hot-switching phenomenon will occur. In this case, a surge voltage is developed in the power feed cable and a large current flows in the relay. Hence the relay may be damaged. With this in mind, the cable branching unit BU is set to the ground potential before switching in order to prevent occurrence of the surge voltage. When power feed paths are established or switched, it is necessary to control the power feed current or voltage output by the power feed equipment in the landing stations so that the branch unit BU is set to the ground potential. Normally, a procedure for setting or switching the power feed paths BU consists of several power feed steps.

In order to perform the above procedure for the underwater cable communications system in which three stations are connected to each other via the cable branching unit, one of the three stations functions as a power integration coordinator (PIC), and the other two stations function as power safety officers PSO. The power integration coordinator directs power up/down of the overall system, and the two power safety officers work under the control of the power integration coordinator.

Assuming now that the station A functions as the power integration coordinator, as shown in FIG. 2A the station A communicates with the station B (or C) by a communications means, as described previously with reference to FIG. 1A. The stations A and B alternately perform a current/voltage control step several times (six times, for example) in order to disconnect, at the cable branching unit BU, the underwater cable connected to the station C from the power feed path between the stations A and B, to ground the disconnected cable to the sea and to establish a power feed path between the stations A and B. A current flowing in the power feed path between the stations A and B is increased to a predetermined level, the communication between the stations A and B is terminated, and the station A starts to communicate with the station C to inform the station of power up, as shown in FIG. 2B. Then, the station C starts power feed between the station C and the cable branching unit BU, as shown in FIG. 2B.

FIG. 3A shows an underwater cable communications system having four cable landing stations A, B, C and D. The power feed procedure described with reference to FIGS. 2A, 2B and 2C can be applied to the system shown in FIG. 3A as follows. First, as shown in FIG. 3A, the station A, functioning as the power integration coordinator, communicates with the station B. Next, the stations A and B alternately perform the current/voltage control step several times (eight times, for example) in order to start the power feed between the stations A and B via cable branching units BU1 and BU2. Then, the station A terminates communication with the station B. Then, as shown in FIG. 3B the station A communicates with the station C and gives the station C an instruction to start a single-end power feed. The station C starts the single-end power feed between the station C and the ground at the cable branching unit BU1 in response to the instruction from the station A. Thereafter, the station A terminates communication with the station C, and calls the station D to instruct the station D to start a single-end power feed, as shown in FIG. 3C. In response to the instruction from the station A, the station D starts the single-end power feed between the station D and the ground at the cable branching unit BU2, as shown in FIG. 3D.

FIG. 4A shows an underwater cable communications system having four landing points, and FIGS. 4B through 4F illustrate the power feed steps for the underwater cable communications system shown in FIG. 4A. Referring to FIG. 4A, the station A operates in a constant-voltage (CV) regulation mode in which the power feed voltage is controlled so that the underwater cable branching units BU1 and BU2 operate in the grounded state. The station B operates in a constant-current (CC) regulation mode in which a current flowing in the power feed path is adjusted. Relays provided in the cable branching units BU1 and BU2 and used to switch the power feed paths can be activated by operating currents i1 and i2, respectively, where it is greater than i2. Symbols in parentheses denote voltages necessary to flow corresponding currents. When currents equal to or greater than the operating currents i1 and i2 respectively flow in the relays in the cable branching units BU1 and BU2, the relays are activated.

In step 1 shown in FIG. 4B, the station B operating in the constant-current mode flows the operating current i2 in the power feed path between the stations A and B. In step 2 shown in FIG. 4C, the station A operating in the constant-voltage mode calculates a power feed voltage to be applied to the power feed path between the station A and the cable branching unit BU2 in a state in which the operating current i2 activating the relay in the cable branching unit BU2 flows therein. Then, the station A applies the calculated voltage to the cable extending therefrom.

In step 3 shown in FIG. 4D, the station B increases the power feed current to a magnitude between that of the operating current i1 and that of the operating current i2. In the process of increasing the power feed current, the power feed current becomes equal to the operating current i2. At this time, the cable branching unit BU2 operates in the grounded state and the relay provided therein is activated. Hence, the power feed path connected to the station D is disconnected from the power feed path between the stations A and B, and is grounded to the sea.

In step 4 shown in FIG. 4E, the station A calculates a power feed voltage to be applied to the power feed path between the station A and the cable branching unit BU1 in a state in which the operating current i1 activating the relay in the cable branching unit BU1 flows therein. Then, the station A applies the calculated voltage to the cable extending therefrom.

In step 5 shown in FIG. 4F, the station B increases the power feed current to the normal operating current. When the power feed current becomes equal to the operating current i1 in the process of increasing the power feed current, the cable branching unit BU1 starts to operate in the grounded state and disconnects the power feed path extending to the station C from the power feed path between the stations A and B. The disconnected power feed path is grounded to the sea. In step 6 (not shown), the station A increases the power feed voltage to the normal operating voltage.

A procedure for power down can be performed in a manner similar to the above-mentioned manner of power up while two of the stations sequentially communicate with each other.

However, the above-mentioned prior art has the following disadvantages. First, it is necessary for the station functioning as the power integration coordinator to call the power safety officers many times until power up/down is completed. Hence, it takes a longer time to complete power up/down as the number of stations increases.

Second, the power safety officer stations are maintained in a standby state until they receive instructions from the power integration coordinator station, and do not have any information on the status of the system. Hence, there is a possibility that an erroneous operation may be performed and the power up/down operation may fail.

Third, a larger number of power feed steps is needed as the number of stations increases. Hence, the procedure becomes complicated, and becomes difficult to find erroneous operation performed at other stations.

SUMMARY OF THE INVENTION

It is a general object of the present invention to provide a power control monitoring system in which the above disadvantages are eliminated.

A more specific object of the present invention is to provide a power control monitoring system in which each cable landing station can monitor the status of progress of power up/down in real time.

The above objects of the present invention are achieved by a power control monitoring system for monitoring a power feed for a cable communications system including n cable landing stations where n is an integer, the power control monitoring system comprising: network means for connecting m cable landing stations among the n cable landing stations to each other by communications lines other than power feed cables connecting the n cable landing stations where m is an integer equal to or smaller than n; sender/receiver means, provided in each of the m cable landing stations, for transferring information concerning the power feed with respect to the m cable landing stations to each other; and control and output means, provided in each of the m cable landing stations, for gathering the information concerning the power feed with respect to the m cable landing stations and outputting the information so that the information is simultaneously output in the m cable landing stations.

BRIEF DESCRIPTION OF THE DRAWINGS

Other objects, features and advantages of the present invention will become more apparent from the following detailed description when read in conjunction with the accompanying drawings, in which:

FIGS. 4A, 4B, 4C, 4D, 4E and 4F are diagrams illustrating a power up procedure:

FIG. 8 is a diagram illustrating an example of display;

FIGS. 9A and 9B are diagrams illustrating multi-windows:

FIGS. 11A and 11B are flowcharts illustrating the operation of the power control monitoring system shown in FIG. 10.

DESCRIPTION OF THE PREFERRED EMBODIMENTS

Figure 1A:
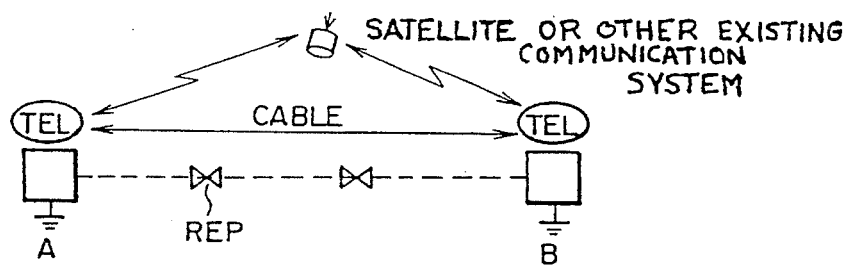
FIGS. 1A and 1B are diagrams illustrating a cable communications system in which two points are connected to each other.
Figure 1B:
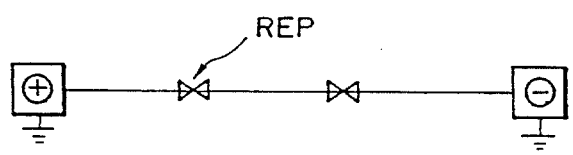
Figure 2A:
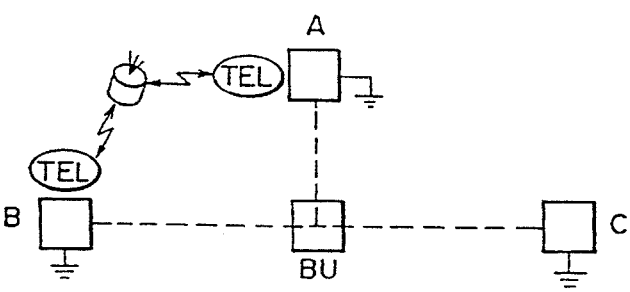
FIGS. 2A, 2B and 2C are diagrams illustrating how power is fed to three points in a cable communications system.
Figure 2B:
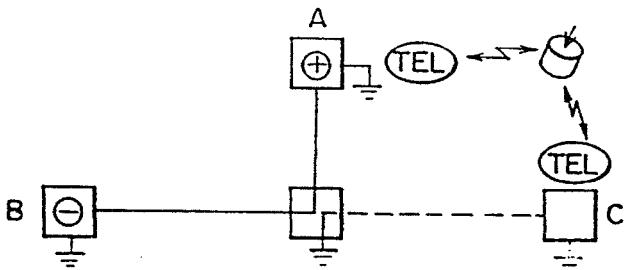
Figure 2C:
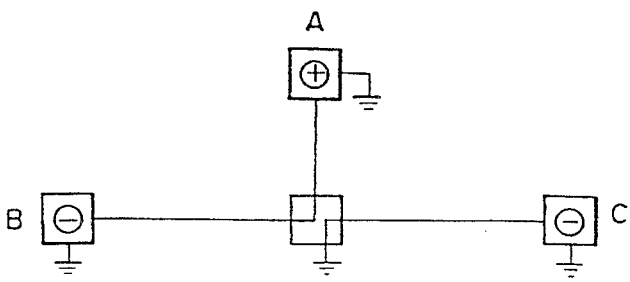
Figure 3A:
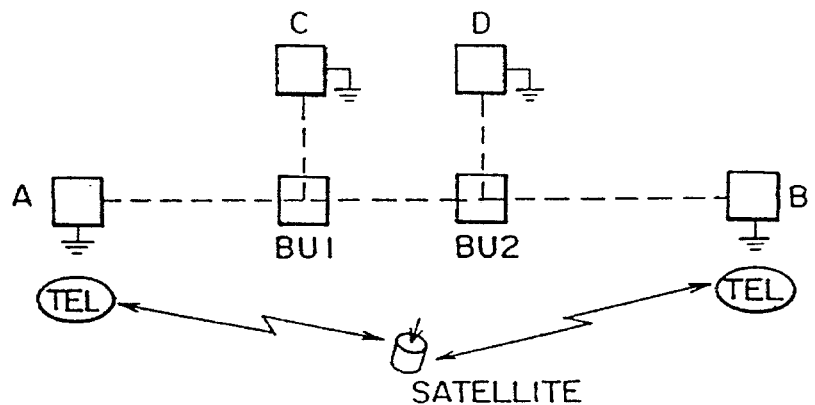
FIGS. 3A, 3B, 3C and 3D are diagrams illustrating how power is fed to four points in a cable communications system.
Figure 3B:
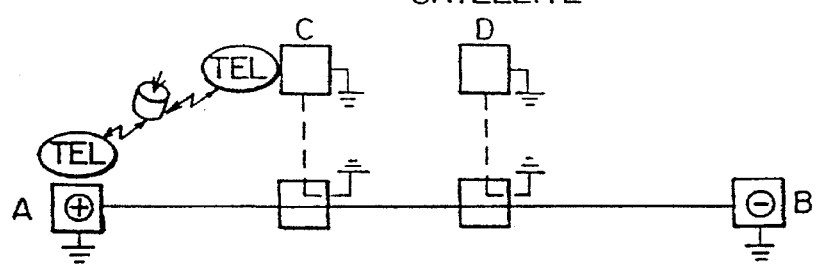
Figure 3C:
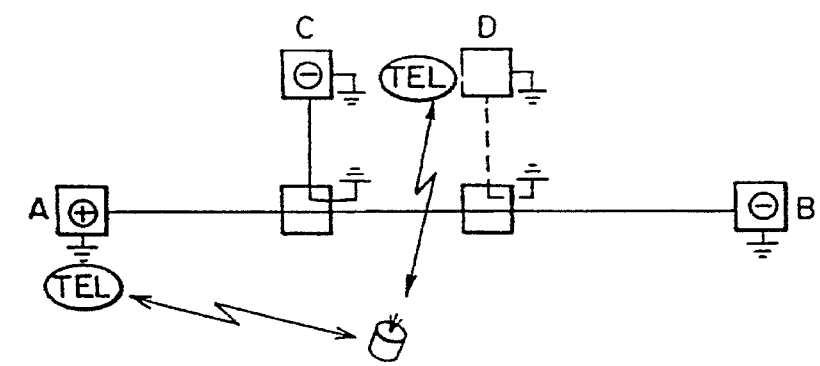
Figure 3D:
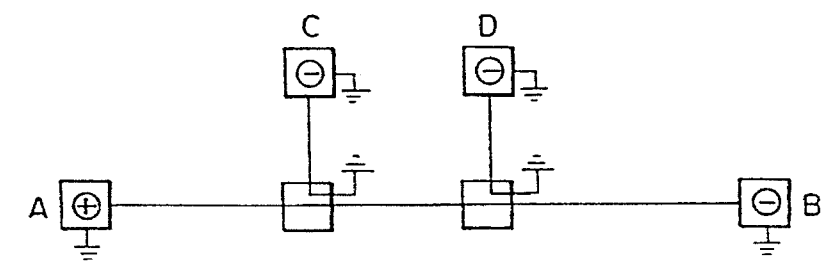
Figure 5:
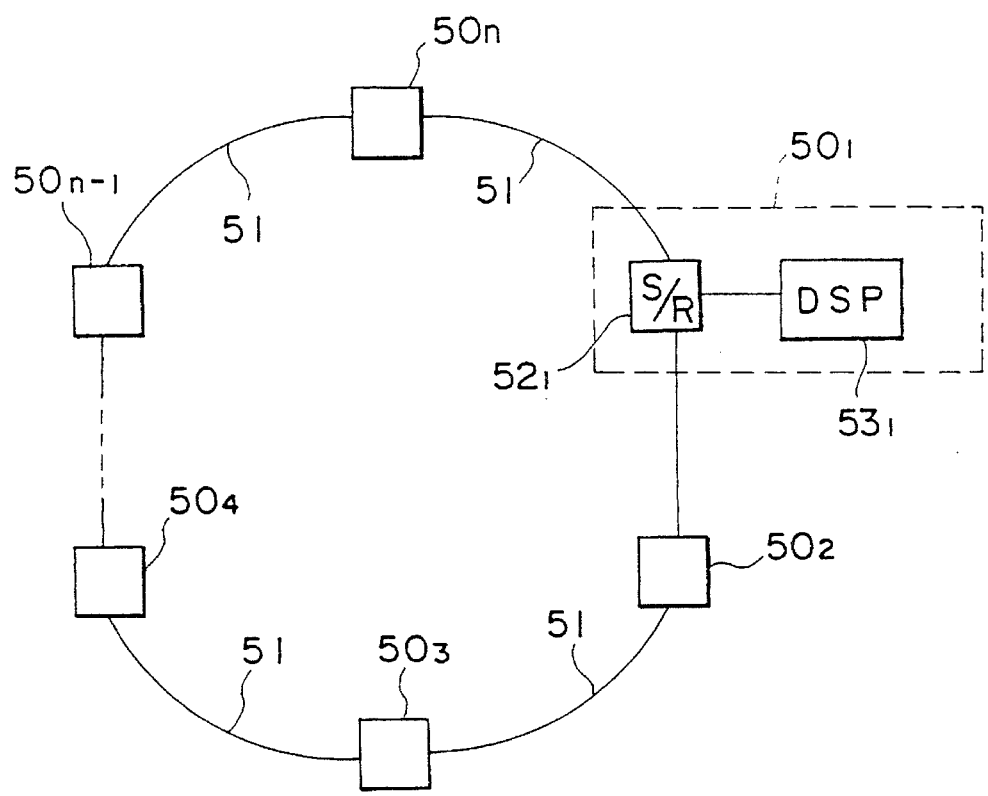
FIG. 5 is a block diagram of a power control monitoring system according to an embodiment of the present invention.

FIG. 5 illustrates an overview of a power control monitoring system (PCMS) according to an embodiment of the present invention. The system shown in FIG. 5 monitors the status of power up/down in an underwater cable communications systems including a plurality of cable landing stations $50_1$–$50_n$. A network for monitoring is configured by connecting the cable landing stations $50_1$–$50_n$ by means of communications lines 51 other than communication cables originally used for the underwater cable communications system. Each of the cable landing stations $50_1$–$50_n$ has a sender/receiver (S/R) unit. In FIG. 5, only a sender/receiver unit $51_1$ provided in the cable landing station $50_1$ is illustrated. The sender/receiver units in the cable landing stations $50_1$–$50_n$ are connected to each other by means of the communications lines 51. The sender/receiver units transfer information concerning power feed in the respective cable landing stations $50_1$–$50_n$. Further, each of the cable landing units $50_1$–$50_n$ includes a display unit connected to the sender/receiver unit. In FIG. 5, only a display unit $53_1$ connected to the sender/receiver unit $52_1$ is illustrated.

The information concerning the power feed in each of the cable landing stations $50_1$–$50_n$ is continually or periodically transferred via the sender/receiver units. For example, the information received via the sender/receiver unit $52_1$ is transferred to the display unit $53_1$, and is displayed thereon. Hence, it is possible to know, at the cable landing station $50_1$, the status of the process for power up/down carried out at the other cable landing stations $50_2$–$50_n$.

Figure 6:
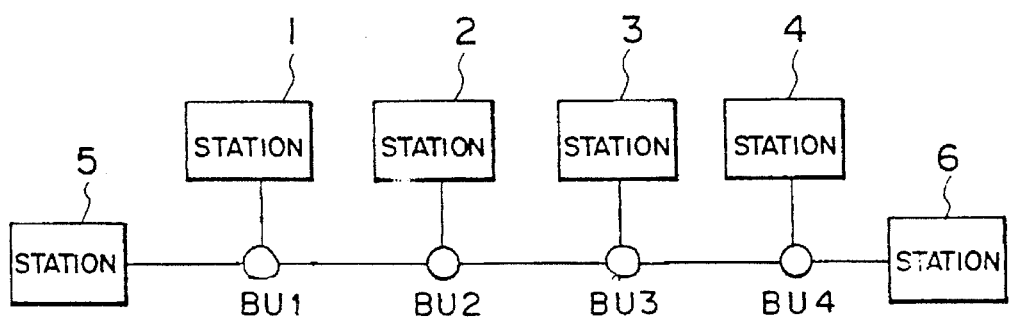
FIG. 6 is a block diagram of a cable communications system to which the embodiment of the present invention is applied.

FIG. 6 illustrates an optical underwater cable communications system to which a power control monitoring system according to the present invention is applied. The optical underwater cable communications system shown in FIG. 6 connects six cable grounding stations 1–6. A main power feed path is provided between the cable landing stations 5 and 6. The cable landing stations 1, 2, 3 and 4 are connected to the main power feed path via underwater cable branching units BU1, BU2, BU3 and BU4, respectively. The cable branching units BU1 and BU3 are of a non-switchable type, and the cable branching units BU2 and BU4 are of a switchable type. The single-end power feeding is performed between the station 1 and the branching unit BU1 and between the station 3 and the branching unit BU3. The branching units BU1 and BU3 are grounded.

Figure 7:
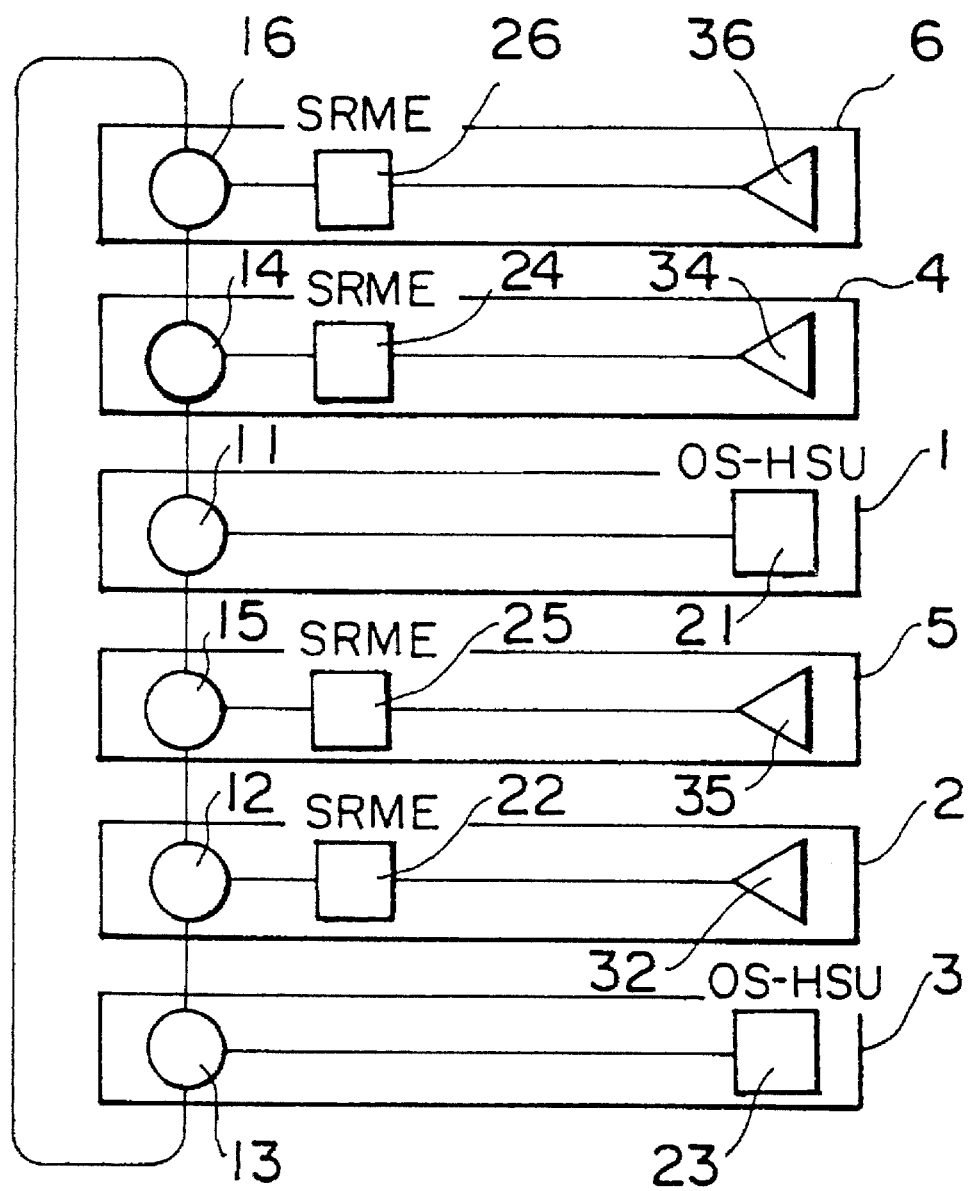
FIG. 7 is a block diagram illustrating the structure of the power control monitoring system shown in FIG. 5.

FIG. 7 shows the structure of the power control monitoring system for the optical underwater cable communications system shown in FIG. 6. The cable landing stations 1–6 respectively include modems 11–16, which are connected to each other via public or private lines provided by a satellite or a existing underwater cable. The cable landing stations 1–6 can transfer information concerning power feed to each other via a network formed by the modems 11–16 and the public or private lines.

The cable landing stations 2, 4, 5 and 6 include system and repeater monitoring equipment (SRME) devices 22, 24, 25 and 26, respectively. Each of the SRME devices 22, 24, 25 and 26 formed with computers has not only the power control monitoring function but also the function of monitoring and controlling repeaters (not shown) and an alarm function for a fault occurring in the overall system or the stations. External terminals (X-terminals) 32, 34, 35 and 36 are connected to the SRME devices 22, 24, 25 and 26, respectively. The cable landing stations 1 and 3 include terminals (OS-HSU) 21 and 23 arranged on the sides of power feed equipments, respectively. The SRME devices 22, 24, 25 and 26, which are connected to power feed equipment (not shown), gather information concerning the power feed equipment, and control the power feed equipment.

One of the cable landing stations 2, 4, 5 and 6 is selected as the power integration coordinator station, and the SRME device of the selected station functions as a host computer of the overall system. The other cable landing stations are connected to the host computer via the communications lines. It will now assumed that the cable landing station 6 functions as the power integration coordinator station, and the other cable landing stations 1–5 function as the power safety officer stations.

The terminals in the cable landing stations 1–6, which correspond to the terminals 32–36 and the terminals 21 and 23, monitor the status of the respective power feed equipment, and gather monitor information concerning the regulation mode, polarity, voltage, current and alarm. The monitor information is transferred among the cable landing stations 1–6, which hold the same monitor information.

The terminal 36 in the cable landing station 6 functioning as the power integration coordinator can specify, for the cable landing stations 1–5, a power feed operation to be executed via the communications lines. Each of the cable landing stations 1–5 operates the power feed equipment on the basis of the instruction from the cable landing station 6, and reports the result of the operation to the cable landing station 6.

FIG. 8 illustrates an example of display on the display unit of the terminal provided in each of the cable landing stations 1–6. An area E1 is used to display the present date and time, as well as the time which has elapsed after the switching operation is started. An area E2 is used to display the status of the power feed paths. For example, the position of a power feed path in which a fault has occurred may be displayed.

An area E3 is used to display parameters concerning the cable landing stations 1–6, such as the regulation mode (CC/CV), the polarity, the power feed current and voltages, the switching status of the cable branching units BU1–BU4, and the position of a fault which has occurred in the system. That is, the area E3 is used to display the status of the overall network. The information displayed on the display unit in each of the cable landing stations 1–6 is automatically updated in accordance with changes in the parameters and the status of the power feed paths. Information concerning the status concerning power feed in the system can be monitored and simultaneously displayed on the display units on the cable landing stations 1–6.

An area E4 is used to display the power feed operation procedure step by step in each of the cable landing stations 1–6. The display on the area E4 is changed during the progress of the power feed procedure. In FIG. 8, the detailed power feed operation procedure performed in the power integration coordinator station 6 is shown. By referring to the area E4, information concerning the power feed operation procedure necessary for power up/down and the current progressing status can be obtained at each of the cable landing stations 1–6.

An area E5 is used to control a request from the power integration coordinator station 6 and a response by the power safety officer stations 1–5 by means of icons. When an icon is selected by means of a mouse or the like, the detailed contents of the item corresponding to the selected icon can be displayed using a multi-window.

FIG. 9A shows a multi-window of a request from the power integration coordinator station 6, and FIG. 9B shows a multi-window of a request by one of the power safety officer stations. The request from the power integration coordinator station 6 shown in FIG. 9A includes "request", "report", "hurry up" "stop the operation", "retry" and "comment". The response shown in FIG. 9B includes "acknowledged", "executed", "wait" and "comment". The operators in the cable landing stations 1–6 can obtain, from the displays shown in FIGS. 9A and 9B, the information concerning the status of progress of the operation. The detailed description of FIGS. 9A and 9B will be described later.

The SRME device 26 in the cable landing station 6 functioning as the host computer analyzes information concerning the power feed current/voltage and similar information obtained at each power feed step from the cable landing stations 1–5, and determines whether or not the information matches predetermined information in order to determine whether each power feed step is correctly performed.

In the power feed procedure shown in FIGS. 4B through 4F, the power feed voltage V changes on the basis of the difference between the ground potentials at two different points, and temperature change. Hence, parameter values actually obtained may deviate from the predetermined parameter values. It is possible to accurately determine how the power feed current I is branched in accordance with Kirchhoff's law. Hence, the host computer in the power integration coordinator station 6 checks predetermined items listed in the following table in order to determine whether or not the power feed is normally operated.

TABLE

|  | CV station | CC station |
|---|---|---|
| (1) polarity (+/−) | | |
| (2) regulation mode (CV/CC) | | |
| (3) power feed current | | |
| (4) power feed voltage | | |

All the items (1)–(4) are monitored in all the power feed steps. The power feed voltage of the stations in the constant-current (CC) mode is monitored for reference. The power feed current of the stations in the constant-current (CC) and constant-voltage (CV) modes is one of the important parameters to determine whether or not switching of power feed paths has been completed.

The host computer in the power integration coordinator station 6 determines, for each power feed step, whether or not the operation has been correctly performed by referring to the power feed current and voltage values in the cable landing stations.

When the specification of the power feed system is changed, information concerning a change in the specification is input to the power control monitoring system via the computers in the cable landing stations 1–6. For example, if the cable length, the number of repeaters, or the characteristics of the underwater cable branching units are changed, information concerning these changes is input to the power control monitoring system, and information previously held in the managing system is automatically updated.

The power control monitoring system does not perform power up/down except for occurrence of a fault after the underwater cable communications system starts to operate. Hence, there is a possibility that the power on/off operations may be not performed over a few decades. In this case, the operator may not be familiar with the power up/down operations.

With the above in mind, the power control monitoring system has a simulation function by the computers provided in the cable landing stations 1–6. For example, pseudo information concerning power up/down for simulation is transferred between the cable landing stations 1–6, so that each of the computers in the cable landing stations simultaneously simulates the power up/down operations. The above simulation function is useful to the operators.

A further description will now be given of the power control monitoring system according to the present invention.

Figure 10:
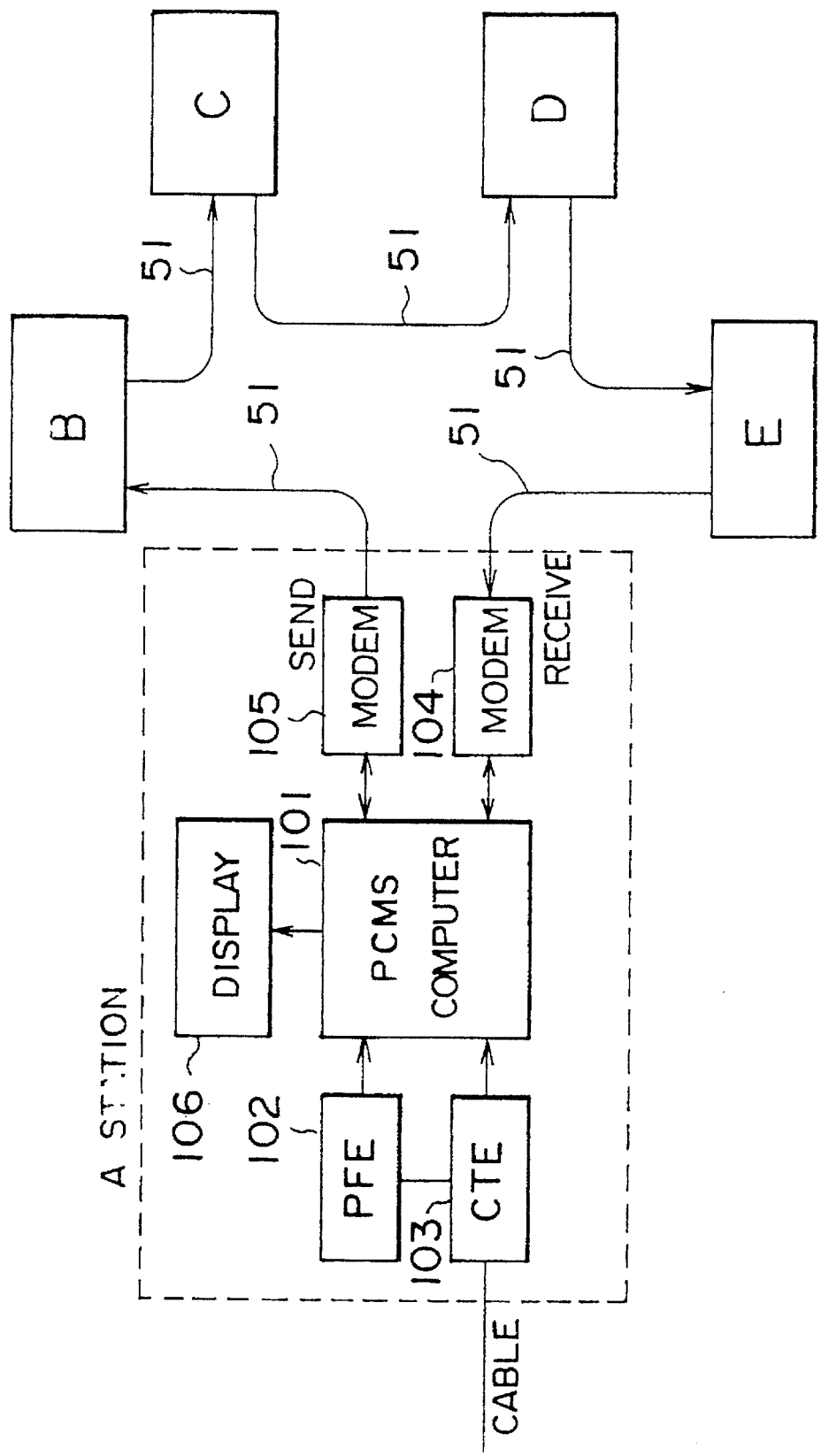
FIG. 10 is a block diagram illustrating the structure of a station according to the embodiment of the present invention.

FIG. 10 is a diagram of the structure of the power control monitoring system according to an embodiment of the present invention. Stations A, B, C, D and E are connected via the communications lines 51. The station A is comprised of a power control monitoring system (PCMS) computer 101 corresponding to the aforementioned SRME device, a power feed equipment (PFE) 102, a cable termination equipment (CTE) 103, modems 104 and 105, and a display unit 106. The PCMS computer 101 control the entire operation of the station A. The cable termination equipment 103 terminates a power feed cable and connects it to the power feed equipment 102. The modem 104 receives information sent by the station E, and the modem 105 sends information to the station B. The information transferred via the communications lines 51 formed in a loop is, for example, a packet signal. The display unit 106 includes a display, a printer and a keyboard.

The PCMS computer 101 includes the following functions:

(1) Power up/down;

(2) PCMS simulation;

(3) PCMS report; and (4) Editor entry/system parameter edit tool.

The PCMS computer provides the following functions during powering steps:

(1-1) Provision of communication toll among cable stations;

(1-2) Instruction of specified powering procedure; and (1-3) Monitoring and displaying the powering status of the system.

Information concerning the above function (1-1) is provided on the PCMS power up/down screens shown in FIGS. 9A and 9B. The power integration coordinator station, for example, station A can send an "operation request" to the power safety officer stations B–E using the operation request window shown in FIG. 9A. The "operation request" maybe composed of the following items:

Request: request for operation of the PFE 102 and CTE 103;

Report: report the operation status;

Hurry up: hurry up the operation;

Stop the operation: stop the operation;

Retry: retry the operation; and

Comment: The power integration coordinator can send a comment.

When each of the power safety officer stations receives the "operation request", it returns a response to the power integration coordinator station. The "response" maybe composed of the following items:

Acknowledged: When each power safety officer station receives the "operation request", it returns an "acknowledged" response to the power integration coordinator station first.

Executed: When each power safety officer station completes the operation, it returns an "executed" response to the power integration coordinator station.

Wait: When each power safety officer station temporarily stops execution of the operation, it sends a "wait" response to the power integration coordinator station.

Comment: Each power safety officer station can send a comment to the power integration coordinator station.

Information concerning the above-mentioned function (1-2) is displayed in the area E4 shown in FIG. 8. Information concerning the above-mentioned function (1-3) is monitored and displayed in all the stations A–E. The details of the above information are as follows. Information concerning the cable termination equipment 103 is concerned with voltage, current and cable head open/connect. The voltage and current information indicates a voltage and current applied to the power feed cable extending from the cable termination equipment 103. The cable head open/connect information indicates whether or not the end of the cable is open or terminated. Further, information concerning the power feed equipment 102 is concerned with the output polarity and the regulation mode. The output polarity information indicates whether or not the cable end is kept positive or negative. The regulation mode information indicates whether the station operates in the constant-voltage mode or the constant-current mode.

The PCMS simulation (trial) function provides the following. As the PCMS computer 101 is not used frequently, trial power up/down operations can be carried out on the PCMS computer 101 for the purpose of training operators. The PCMS trial function can be performed with each station connected via the communication lines. The power feed equipment 102 is not actually operated in the simulation process. The objective output voltage and current values of the power feed equipment 102 are automatically produced as trial data.

The PCMS usage history (power up/down and PCMS trial) up to now can be saved and printed out as necessary.

The editor entry/system parameter edit tool function is as follows. The editor entry function is used to register the execution right of a PCMS system parameter edit tool for its activation. A system parameter includes parameters needed to calculate the power feed equipment operation settings. For example, such a system parameter is concerned with cables, branching units and repeaters. If a need to change the system parameter arises from repairing the cable, a branching unit or a repeater, and the operator at each station changes it individually and independently, each station may possibly end up with a different parameter. This is because only a station which acquires the execution right with this function can change the parameters. Executing the editor entry, the operator of each power safety officer station can inform all other stations through the modem that it has acquired the right as a system parameter editor.

The system parameter edit tool is to display and change a parameter to be used by the PCMS computer 101. The system parameter is installed to calculate the system power feeding voltage, the branching unit setting voltage and so on. It is mainly used to make an adjustment when the PCMS computer 101 is installed or maintained. The tool is used for changing and displaying the including data:

cable length;

cable resistance;

switchable branching unit parameters;

non-switchable branching unit parameters;

repeater voltage drop;

number of repeaters;

CTE parameters;

CTE/PFE parameters;

PFE voltage drop; and earth cable parameters.

These parameters are used to obtain the current-voltage characteristics of the cable landing stations A–E. After the parameters are changed, these parameters are saved and transferred to all the other stations.

Figure 11A:
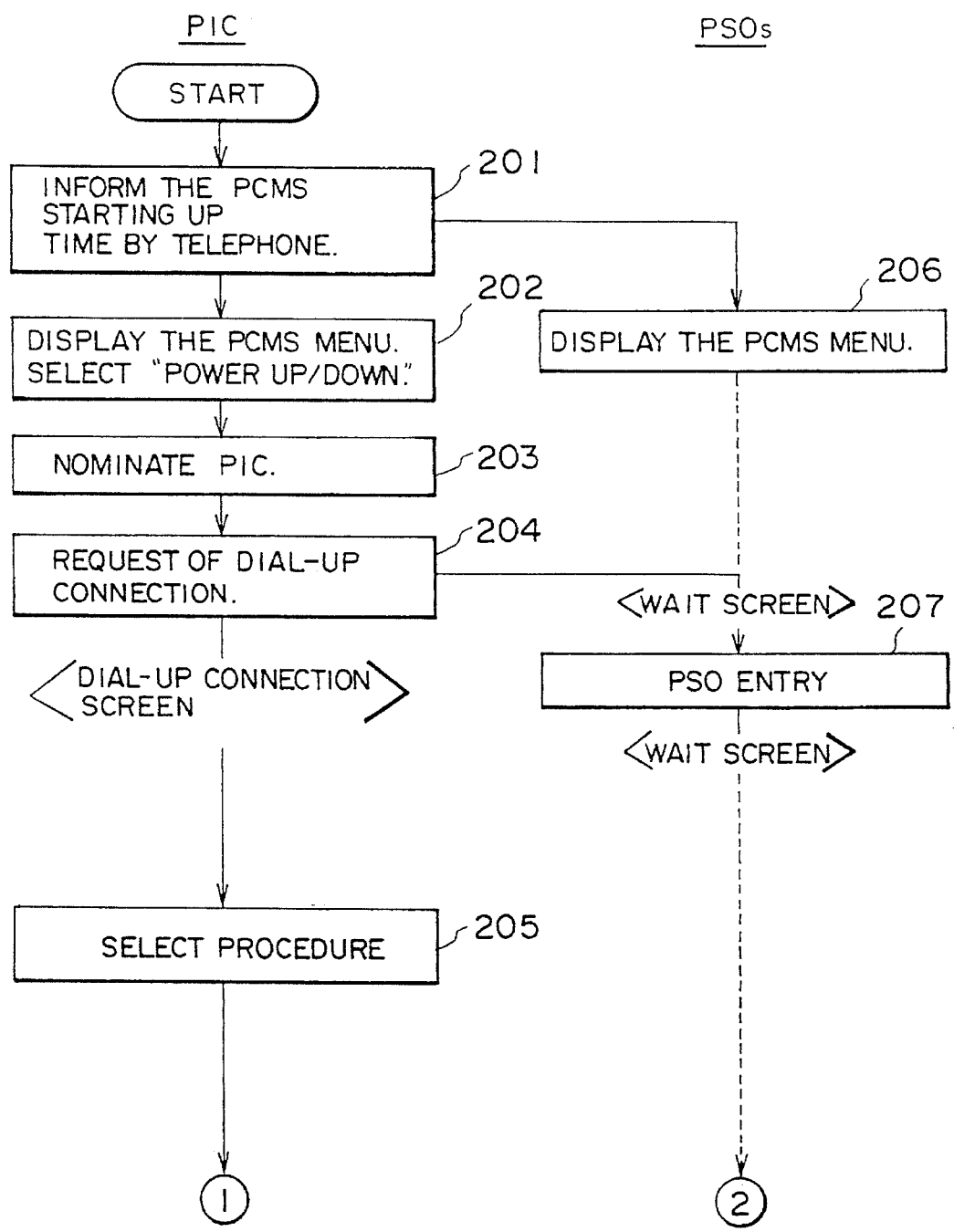

FIGS. 11A and 11B are flowcharts of the power up/down procedure. In step 201, the station A, functioning as the power integration coordinator station, informs the stations B–E of the starting-up time. In step 202, a PCMS menu indicating the aforementioned functions (1)–(4) is displayed on the display unit 106. The operator selects "power up/down" from among the displayed items. In step 203, the operator specifies the station A as the power integration coordinator. In step 204, the PCMS computer 101 generates a request for dial-up connection. Then a dial-up connection screen becomes available. Thereafter, the operator selects a desired power feed procedure in step 205.

In each of the power safety officer stations B–E, in step 206, the PCMS menu is displayed in response to the notification from the power integration coordinator station A. In step 207, the PCMS computer 101 in each of the power safety officer stations B–E registers information indicating that it functions as the power safety officer station.

In step 208, the PCMS computer 101 of the power integration coordinator station A checks whether or not the selected procedure can be performed. For example, the PCMS computer 101 refers to information indicating the position of a fault and determines whether or not the selected procedure is affected by the fault. When there is no problem, the PCMS computer 101 starts the power up/down operation in step 210. In response to step 208, each of the power safety officer stations B–E checks the selected procedure. When there is no problem, the PCMS computer 101 starts the power up/down operation in step 210.

The details of step 210 will be described later with reference to FIG. 12.

When the power up/down operation is completed, in step 211 the PCMS computer 101 of the power integration coordinator station obtains the powering status in order to determine whether or not there is no problem in each of the stations A–E. The information concerning the powering status is output and the operator confirms it. In each of the power safety officer stations B–E, information concerning the powering status is also output and the operator confirms that the displayed voltage and current do not have any problem in step 212.

In step 213, the PCMS computer 101 asks the operator if the line can be disconnected by means of the display unit 106. When an instruction to disconnect the line is given by the operator, the line is actually disconnected in step 215. In step 214, the instruction to disconnect the line is displayed, and the line is actually disconnected in step 216.

Figure 12:
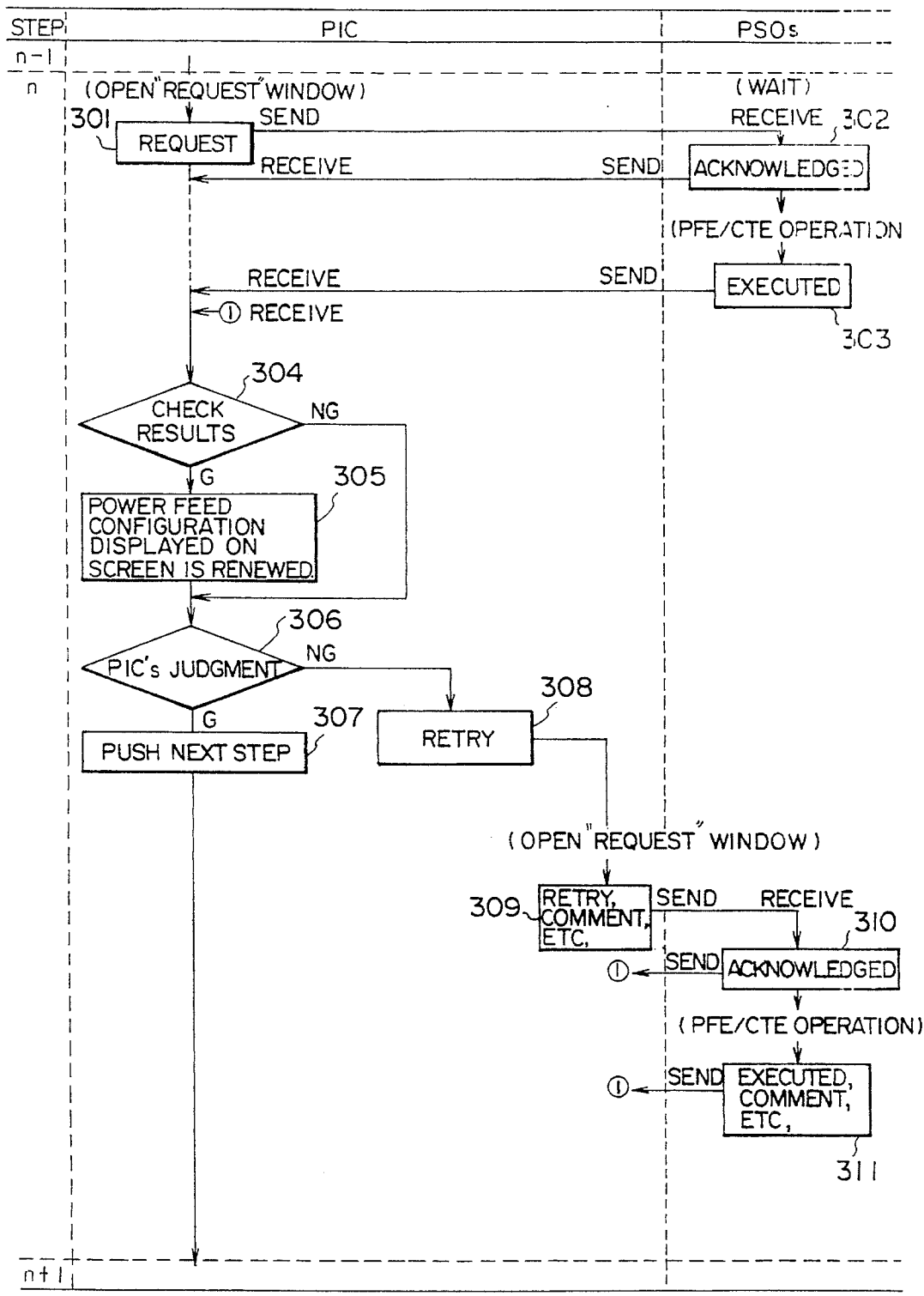
FIG. 12 is a flowchart of a power up/down procedure executed in the operation shown in FIGS. 11A and 11B.

FIG. 12 is a detailed flowchart of step 210 shown in FIG. 11B. The PCMS computer 101 of the power integration coordinator station A opens the request window shown in FIG. 9A, and sends the operation request to the power safety officer station, for example, B in step 301. In response to receipt of the operation request, the station B sends the "acknowledged" response to the station A in step 302. Then, the power up/down operation on the power feed equipment (PFE) 101 and the cable termination equipment (CTE) 102 is carried out under the control of the PCMS computer 101. When the above power up/down operation is completed, the station B sends the "executed" response to the station A in step 303. When the station A receives the "executed" responses from all the related stations, the PCMS computer 101 of the station A executes the automatic check process, and determines, in step 304, whether or not the parameter values obtained from the other stations match parameter values obtained from the system parameters.

As has been described previously, the information concerning the output voltage and current, the regulation mode, the polarity and so on is always transferred in the loop of the communications lines 51, and is displayed at each of the stations. When the "executed" responses have been received from all the stations B–E, the PCMS computer 101 of the station A calculates the parameter values by referring to the system parameters, and determines whether or not the parameter values received from the other stations match the parameter values obtained from the system parameters.

When it is concluded, in step 304, that the parameter values received from the other stations match the parameter values obtained from the system parameters, the PCMS computer 101 of the station A displays the system configuration in the area E3 shown in FIG. 8, and executes step 306. When it is concluded, in step 304, that the parameter values received from the other stations do not match the parameter values obtained from the system parameters, the system PCMS computer 101 of the station A directly executes step 306.

In step 306, the PCMS computer 101 of the station A determines if the power up/down operations in the stations B–E have been completed without error by referring to the matching results. When the result of the step 306 determination is affirmative, the PCMS computer 101 of the station A starts the next step in step 307. When the result of the step 306 determination is negative, the PCMS computer 101 of the station A determines, in step 308, that the power up/down operation should be retried in one or more stations. In step 309, the PCMS computer 101 of the station A makes the display unit 106 display the window shown in FIG. 9A, and sends a request for retrying the operation to, for example, the station B. In step 309, send a comment message can be delivered to the station B.

In response to receipt of the retry request, the station B returns the "acknowledged" response to the station A in step 310, and performs the power up/down operation of the power feed equipment 102 and the cable termination equipment 103. When the above power up/down operation is completed, the station B sends the "executed" response to the station A in step 311. When the station A receives the "executed" responses from the stations to which the retry request has been sent, the PCMS computer 101 of the station A executes the automatic check process in step 304.

It will be noted that the PCMS trial function does not actually operate the power feed equipment 102 and the cable termination equipment 103. That is, the "acknowledged" and "executed" response are simply returned to the power integration coordinator station. In step 304, the PCMS computer 101 provides for pseudo parameter values concerning each of the stations for trial, and compares these pseudo parameter values with the parameter values derived from the system parameter values.

Variations of the above-mentioned embodiment of the present invention can be made without departing from the scope of the invention. For example, the power up/down operations shown in FIG. 12 can be manually or automatically performed. The network is not limited to the loop type. Other types of networks can be used. It is also possible to connect some cable landing stations among all the stations to the power integration coordinator station.

The present invention is not limited to the specifically disclosed embodiments, and variations and modifications may be made without departing from the scope of the present invention.

What is claimed is:

1. A power control monitoring system for monitoring a power feed for a cable communications system including n cable landing stations, where n is an integer, and power feed cables connecting the n cable landing stations, said power control monitoring system comprising:

network means, provided separately from said power feed cables, for connecting m cable landing stations among said n cable landing stations to each other by communications lines, where m is an integer equal to or smaller than n;

sender/receiver means, provided in each of the m cable landing stations, for transferring information concerning the power feed associated with the m cable landing stations via said network means; and control and output means, provided in each of the m cable landing stations, for gathering and outputting the information concerning the power feed associated with the m cable landing stations and outputting said information so that said information is simultaneously output in the m cable landing stations.

2. The power control monitoring system as claimed in claim 1, wherein said control and output means provided in each of the m cable landing stations include display means for displaying said information on a screen.

3. The power control monitoring system as claimed in claim 1, wherein said control and output means include means for schematically outputting a power feed status of the cable communications system.

4. The power control monitoring system as claimed in claim 2, wherein said display means include means for schematically displaying a power feed status of the cable communications system.

5. The power control monitoring system as claimed in claim 1, wherein said control and output means include means for displaying a power up/down procedure for starting or stopping the power feed, and a status of progress of the power feed.

6. The power control monitoring system as claimed in claim 3, wherein said control and output means include displaying a power up/down procedure for starting or stopping the power feed, and a status of progress of the power feed.

7. The power control monitoring system as claimed in claim 1, further comprising decision means for determining whether or not a power up/down procedure has been properly performed by referring to the information gathered from the m cable landing stations and predetermined information concerning the m cable landing stations.

8. The power control monitoring system as claimed in claim 1, further comprising updating means for manually updating the information on the basis of a change in the cable communications system.

9. The power control monitoring system as claimed in claim 1, further comprising computer simulation means for simulating the power feed for the cable communications system.

10. The power control system as claimed in claim 1, further comprising means for performing a power up/down procedure.

11. The power control system as claimed in claim 1, wherein said network means include a network.

12. The power control system as claimed in claim 1, wherein:

said control and output means in one of said m cable landing stations includes means for generating a request signal for instructing each of the other (m–1) cable stations to execute a power up/down procedure; and said control and output means in each of other (m–1) cable landing stations includes means for said m cable landing stations of completion of execution of the power up/down procedure.

\* \* \* \* \*